United States Patent [19]

Ludowyk

[11] Patent Number: 4,575,718

[45] Date of Patent: Mar. 11, 1986

[54] COMPONENT STATE MONITORING

[75] Inventor: Christopher J. Ludowyk, Brighton, Australia

[73] Assignee: The Commonwealth of Australia, Australia

[21] Appl. No.: 405,418

[22] Filed: Aug. 5, 1982

[30] Foreign Application Priority Data

Aug. 7, 1981 [AU] Australia ............................... PF0118

[51] Int. Cl.⁴ ......................... H04Q 1/00; G08B 21/00

[52] U.S. Cl. ................................ 340/825.17; 340/644; 340/686; 137/554

[58] Field of Search .................... 340/825.17, 507, 644, 340/524, 686; 324/436; 137/552-554

[56] References Cited

U.S. PATENT DOCUMENTS

| | | | |
|---|---|---|---|
| 3,571,800 | 3/1971 | Taylor et al. | 340/644 |
| 3,832,629 | 8/1974 | Cernek, Jr. | 324/436 |
| 4,007,380 | 2/1977 | Thurgood | 340/507 |
| 4,381,507 | 4/1983 | Parmer | 340/686 |
| 4,456,908 | 6/1984 | Morroll et al. | 340/644 |

*Primary Examiner*—Donald J. Yusko

*Attorney, Agent, or Firm*—Stevens, Davis Miller & Mosher

[57] ABSTRACT

Apparatus suitable for use with an operative system for monitoring the operational state of at least one system component such as a valve, which can adopt three possible states. The apparatus includes a state signal generator for operative association with the component and is responsive to the state of the component. The apparatus generates a first steady state signal whenever the component is in first state, a second steady state signal when the component is in a second state and a time varying signal such as a square wave when the component is in a third state.

18 Claims, 5 Drawing Figures

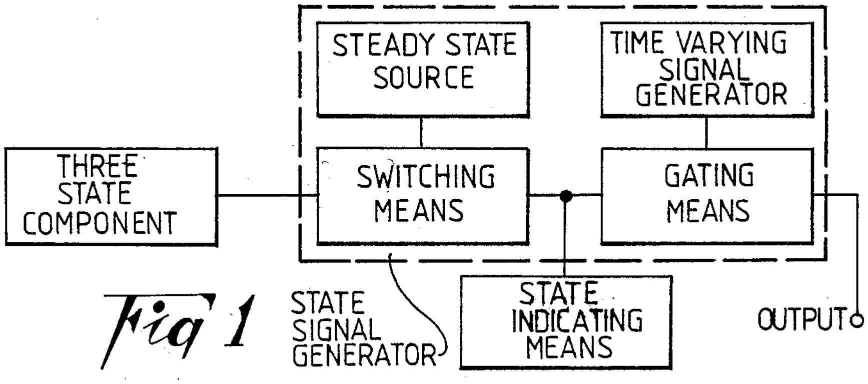
Fig 1
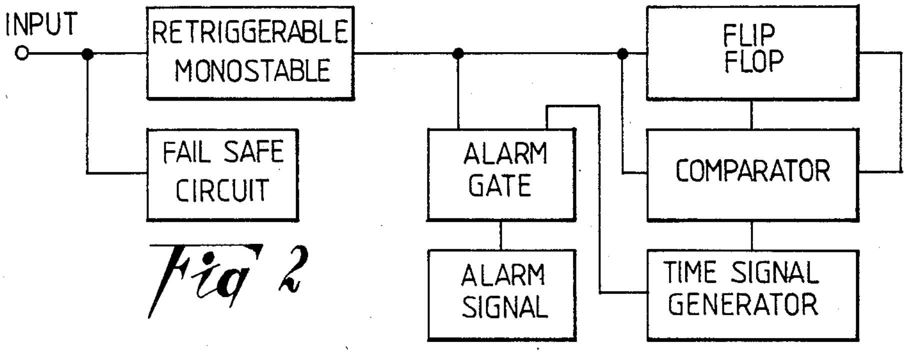
Fig 2
Fig 3
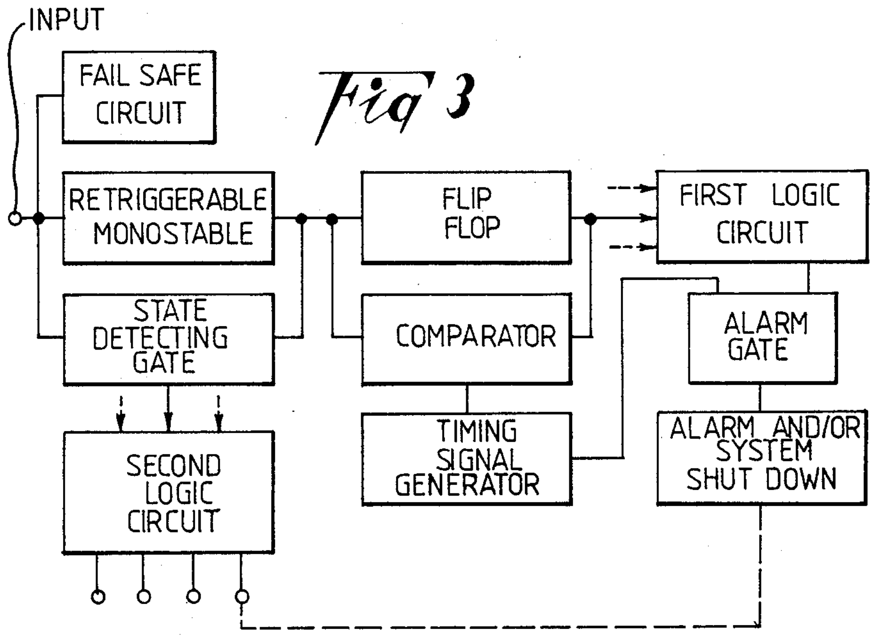

COMPONENT STATE MONITORING

The present invention relates to apparatus for monitoring the state of a component of an operational system, the component having a plurality of states.

The component may have two operational states and a third intermediate state through which the component passes when transiting from one operational state to the other.

The apparatus of the present invention will hereafter be described with particular reference to valves of a hydraulic circuit although it will be appreciated that the present invention is not thereby limited to such applications. The operational states described above may correspond to the fully open and fully closed positions of the valves respectively. The present invention may in one form be adapted to monitor the state of valves in the hydraulic circuit of a dynamic test rig such as is used in the testing of aircraft wings.

Dynamic test rigs which are used in the testing of aircraft wings include hydraulic jacks and valves controlling flow of hydraulic fluid to and from the jacks. These valves should be maintained fully open or fully closed, they are not permitted to remain in a partially open condition. Since the valves in such systems may be manually operable they are prone to being left accidentally in a partially open position. This could be due to a faulty valve which appears to the operator to be in the fully closed or fully open position or it may be the result of operator carelesness. It is desirable to be able to detect whenever one or more valves are not fully open or fully closed so that a warning signal will be generated to alert the operator to existence of the fault.

In some test rigs certain valves may be incompatible combinations of states. For example, two valves may not be permitted to be simultaneously closed otherwise damage to the test rig or the workpiece being tested may result. It is therefore desirable to be able to simultaneously monitor the states of all of the valves in the test rig and to provide a warning signal whenever two or more of the valves remain in an undesirable combination of states.

It is further desirable to be able to detect faults in the monitoring apparatus per se. Accordingly the apparatus preferably includes a fail-safe mechanism in the monitoring circuit.

It is an object of the present invention to provide apparatus for generating signals indicative of three states of a system component, the signal being suitable for processing via a detecting circuit.

According to the present invention there is provided apparatus suitable for use with an operative system for monitoring the operational state of at least one system component, said component having three states, said apparatus including a state signal generator for operative association with the component and responsive to the state of the component to generate a first steady state signal whenever said component is in a first state, a second steady state signal whenever said component is in a second state and a time varying signal whenever said component is in a third state.

In an embodiment of the apparatus for monitoring the state of a valve, the first signal preferably is generated when the valve is fully shut and the second signal may be generated when the valve is fully open. The time varying signal preferably is generated when the valve is in an intermediate position, ie. between the fully open and fully shut positions.

The first signal preferably comprises a first digital signal and said second signal may comprise a second digital signal, said time varying signal preferably comprising an alternating current signal. The first digital signal may be a logical high signal and the second signal may be a logical low signal or vice versa. The time varying signal preferably is an alternating current signal such as a square wave. In one form the time varying signal may comprise a 1 KHz square wave signal. Accordingly the state signal generator preferably includes a square wave generator for producing the time varying signal.

The square wave generator may be provided in any suitable form. For example the square wave generator may comprise an astable multivibrator. In one form the astable may be provided by a suitably configured timer such as a circuit type NE555C.

The state signal generator preferably includes switching means for operative association with the component being monitored and operative to adopt one of three states corresponding to the respective states of the component. For example, the switching means may comprise a two pole switch having a moving contact and two fixed contacts or poles. The moving contact may be connected to a steady state source, a first pole of the switch being connected to the steady source when the component is in its first state, and the second pole of the switch being connected to the steady state source when the component is in its second state. Preferably neither pole is connected to the steady state source when the component is in its intermediate state. The two pole switch may comprise a microswitch associated with the component, a respective pole of the microswitch being arranged to be closed by the moving contact when the component is in one of its operational states.

As an alternative to providing a two-pole microswitch, in the case where the component is a valve, the moving contact may be associated with the valve plunger or stem and fixed contacts or poles may be provided on the valve body, the moving contact being arranged to engage with the poles on the valve body only when the valve is in its fully open or fully shut condition.

In any case the switching means preferably includes a pair of poles or contacts to which a voltage supply corresponding to a logical high may be connected when the component is in one of its extreme states. Preferably neither pole is energised when the component is in its intermediate state.

The state signal generator preferably includes gating means to direct one of three signals corresponding to the state of the component to the output thereof. The gating means may be coupled to the switching means so as to be responsive to the state of the switching means.

The gating means may comprise a pair of two input NOR gates. A first NOR gate may have one of its inputs connected respectively to one pole of the two-pole switch and the other input may be connected to the output of the time varying signal generator.

The second NOR gate may have one of its inputs connected to the output of the first NOR gate and the other input may be connected to the second pole of the two-pole switch. The output of the second NOR gate, preferably connected through an inverter, constitutes the output of the state signal generator. This output may be connected to a line for carrying signals indicating the state of the component.

A state signal generator preferably is associated with each component being monitored so that the state of each component may be detected at a remote location.

The apparatus may include state indicating means for indicating the state of a component at the location of the component. The state indicating means preferably includes display means. The display means may include light emitting diodes (LEDs) and associated drivers operative to indicate the state of the corresponding component, such as a valve. The drivers preferably comprise transistors operative to supply power to the LED s in response to the operation of the switching means.

For example, the pole of output of the switching means corresponding to the shut position of a valve may be connected to the base of a first transistor and arranged so that the transistor switches power to its associated LED when the valve is shut whereby to provide a local display of that position. The pole or output corresponding for the shut position preferably is applied through an inverter to the base of a second transistor so that the second transistor switches power to its associated LED to provide a display of a "not shut" position of the valve. The "not shut" position corresponds to a fully open or partially open position of the valve.

The pole or output of the switching means corresponding to the fully open position of the valve may be applied to the base of a third transistor which may be adapted to switch power to its associated LED when the valve is fully open to provide a display of that position of the valve.

The apparatus of the present invention preferably includes state detecting means for detecting the state of the or each component at a remote location. The detecting means may further be adapted to provide an indication whenever a predetermined condition of the operational system is detected. For example, a predetermined condition may be that the component has been in its say, third state for a predetermined period of time. Alternatively, or in addition, a further predetermined condition may comprise a situation in which two or more components simultaneously remain in undesirable or incompatible states. For example this might occur when two given valves become fully closed simultaneously.

The state detecting means preferably includes at least one state detecting circuit connectable to the output of a state signal generator for identifying any one of the three distinct state signals. That is, the detecting circuit is operative to distinguish between incoming signals indicative of the three states, e.g. the two operative positions of a valve for example, and the intermediate position thereof. Preferably one state detecting circuit is provided for each state signal generator and associated component.

The or each state detecting circuit may include means for detecting a change from either operational state to the intermediate state. In one form the state detecting circuit may include means for detecting the presence of the time varying signal, in particular a 1 KHz square wave signal. Preferably the state detecting circuit includes a retriggerable monostable circuit which is edge triggered and is operative to provide an output signal which is maintained as long as the 1 KHz square signal is being received by the state detecting circuit. Preferably the output signal of the monostable circuit is a logical high signal.

The state detecting means may include a timing signal generator adapted to produce a timing signal having a predetermined duration. The timing signal may be actuated in response to detection of a transition of the component being monitored, to its intermediate state. In the case of manually operable valves being monitored, the timing signal may comprise, for example, a 30 second pulse. The outputs of the monostable circuit and the timing signal generator may be applied to an alarm gate operative to generate an alarm signal if the output of the monostable circuit is still indicating the intermediate state of the component at the expiration of the 30 second period.

The state detecting circuit may include a flip flop. Preferably the output of the monostable circuit is applied to the flip flop. The output of the monostable may also be applied to one input of a comparator. The other input of the comparator preferably is connected to the output of the flip flop. The comparator may be operative to generate a pulse when the output of the monostable becomes high, corresponding to a change of the component from one operational state to the intermediate state.

In this situation the input of the flip flop becomes high before the output due to the time delay provided by the flip flop. This produces a short duration difference between the two inputs to the comparator. The comparator thus is operative to generate a pulse in response to the change of state and this pulse may be applied to the timing signal generator to actuate the generation of the timing signal applied to the alarm gate.

Where the state of more than one component is being monitored the outputs of respective state signal generators associated with the components, may be applied to respective state detecting circuits of the state detecting means. Each state detecting circuit preferably includes a monostable circuit and a flip flop for each component being monitored. A plurality of comparators may also be provided in which case the comparators may be connected in cascade so that if any one component changes from one of its operational states to its intermediate state, the timing signal generator becomes triggered.

Where a number of components is being monitored and an indication is desired whenever one or more of the components has been in its intermediate state for a predetermined period of time, the outputs of the flip flops may be applied to a suitable logic circuit. The logic circuit may include an array of NOR gates. The NOR gates may have their inputs connected to the outputs of preselected flip flops. The inputs may be connected such that a logical high signal applied to any input of a NOR gate (corresponding to one of the components being in its intermediate states) will result in a logical low signal at the output of the respective NOR gate. The outputs of the NOR gates may be connected to respective inputs of a NAND gate so that if any NOR gate output is logical low the NAND gate will provide a logical high output.

The output of the NAND gate may be connected through an inverter to one input of the alarm gate of the state detecting means.

The alarm gate preferably comprises a NOR gate so that the timing signal applied to a second input thereof will maintain the output of the alarm gate at logical low when the output of the logic circuit is applying a logical low signal at the other input, indicative of a component being in its intermediate state. At the expiration of the predetermined duration the timing signal is removed from the input of the alarm gate. If at the expiration of this duration the logic circuit still is applying a logical low signal to the associated input of the alarm gate, this will cause a logical high at the output of the alarm gate. The logical high at the output of the alarm (NOR) gate constitutes a signal indicative of an undesired condition.

The output of the alarm gate may be connected to a suitable visual or audible warning system or device to alert the operator that an undesirable state has occurred. The warning system may include a latch circuit as described in Australian Patent Application No. PE 7500. The output of the alarm gate may also be used to initiate a shut-down of the hydraulic operation.

Where an undesired condition of the operational system corresponds to a state where it is undesirable for two or more components to be simultaneously in predetermined states, the state detecting means preferably includes means for detecting when one or more component is in an operational condition or in an intermediate condition or any combination thereof.

Accordingly each state detecting circuit may include a retriggerable monostable circuit and a flip flop as above, each monostable circuit receiving an output signal from a corresponding state signal generator. Each state detecting circuit may further include a state detecting gate, preferably comprising a NOR gate.

One input of each state detecting gate preferably is connected to the output signal from the corresponding state signal generator. The other input of the state detecting gate may be connected to the output of the retriggerable monostable circuit. It may be seen that the state detecting gate is operative to produce one logical signal (high or low) when the output from the state signal generator indicates that the component is in one operational condition, and is operative to produce the other logical signal when the component is in the other operational condition or is in the intermediate condition.

In operation, if the incoming signal from the state signal generator is logical low (say corresponding to a shut valve) the two inputs to the state detecting NOR gate will both be low and the output of the state detecting NOR gate will be logical high. If the square wave signal is being received, the output of the monostable will be logical high and therefore the output of the state detecting NOR gate will be logical low. Similarly if a logical high signal is being received, the output of the state detecting NOR gate will be logical low. Thus the output of the state detecting NOR gate will be logical high when the valve is shut and will be logical low if the valve is either partially or fully open.

The output of the or each state detecting gate may be connected to a combinational logic circuit. The logic circuit may include an array of NOR gates, NAND gates and/or inverters interconnected to provide the necessary combinational logic. The logic circuit may be adapted to compare the outputs of two or more state detecting gates, or to compare the outputs of two or more groups of state detecting gates.

The logic circuit may be adapted to generate an output signal indicative of two or more components being in incompatible states, or to generate a plurality of outputs providing specific information about a particular group or groups of components which are in incompatible states.

For example, if it is predetermined that two particular valves in a hydraulic circuit are not permitted to be simultaneously closed, the respective outputs of the state detecting gates for the two particular valves may be coupled to the inputs of a NAND gate, the output of the NAND gate being passed through an inverter to an output line. In this case if both outputs of the respective state detecting gates are logical high, a logical high signal will be generated at the output line indicating that both valves are simultaneously closed. As described above a signal on the output line may be used to initiate a shut down of the hydraulic operation and/or to generate a suitable alarm signal.

The apparatus of the present invention may include a fail-safe circuit for use in association with the signal line carrying any one of three distinct state signals between each state signal generator and respective state detecting circuit. The fail-safe circuit may include a time varying signal generator such as an A/C generator, for example a square wave generator. The time varying signal generator preferably is connected to the or each state detecting circuit in parallel with the signal line carrying the state signals. The time varying signal generator preferably is connected to the state detecting circuit via a relatively high impedance eg. a high resistance, such that signals on the signal line will, under normal operation, override the signal applied to the line by the time varying signal generator. However when an open circuit occurs in the signal line, such as may be caused by accidental disconnection or a break in the line, the time varying signal generator is operative to apply a time varying signal to the state detecting circuit.

The fail-safe circuit may be coupled to the input line or lines of the state detecting means. In one form a 1 KHz square wave generator may be connected to an input line of each state detecting circuit via a 100K ohm resistor. If desired a single 1 KHz generator may be used. The output of the generator may be connected to each input line of the detecting means via respective 100K ohm resistors.

In the event of an open circuit in a signal line carrying the signal from the state signal generator to a state detecting circuit the 1 KHz generator will apply a square wave signal to the input of the state detecting circuit immediately upon such open circuit occurring and irrespective of the state of the respective component.

Thus after the predetermined time period, determined by the timing signal generator, a fault signal will be generated at the output of the alarm gate. If desired the 1 KHz signal provided by the generator of the fail-safe circuit may be utilized for clock pulses for the or each flip flops of the state detecting means.

Preferred embodiments of the present invention will now be described with reference to the accompanying drawings wherein:

FIG. 1 shows in block diagram form one embodiment of a state signal generator according to the present invention;

FIG. 2 shows in block diagram form one embodiment of a detecting circuit according to the present invention;

FIG. 3 shows in block diagram form another embodiment of a detecting circuit according to the present invention;

Figure 4:
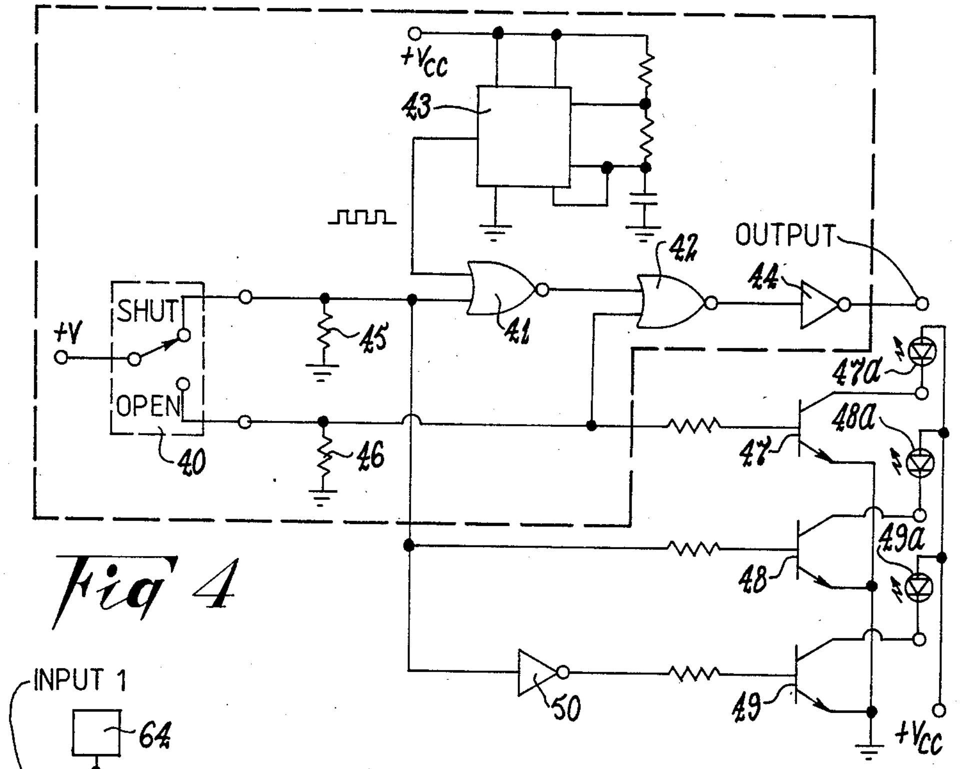
FIG. 4 shows in schematic form a preferred embodiment of a state signal generator according to the present invention.

The state signal generator shown in FIG. 1 comprises switching means connectable to the system component being monitored. The switching means has connected thereto a steady state source. The switching means is connected to gating means and state indicating means for indicating the state of the component at the location thereof. The gating means has connected thereto a time varying signal generator and is adapted to provide at its output one of the three signals corresponding to the state of the component.

The state detecting circuit shown in FIG. 2 is adapted to receive an input from a state signal generator as shown in FIG. 1. The state detecting circuit includes a retriggerable monostable adapter to detect a change from the first or the second state of the component to the third state. The monostable output is connected to a flip flop and the comparator has its two inputs connected between the input and output respectively of the flip flop. The comparator is adapted to trigger a timing signal generator, the output of which passes to an input of an alarm gate. The monostable output is also connected to an input of the alarm gate which is adapted to trigger an alarm signal whenever the alarm gate detects that the output of monostable is indicating the third state of the component at the end of a period determined by the timing signal generator. A fail safe circuit is also connected at the input of the detecting circuit. The fail safe circuit is adapted to trigger the alarm gate in the event that the input becomes disconnected from the state signal generator.

The state detecting circuit shown in FIG. 3 may also receive an input from the state signal generator of FIG. 1. FIG. 3 shows a monostable circuit, flip flop, comparator and timing signal generator are interconnected as in FIG. 2. The alarm gate however is connected to the output of the flip flop via a first logic circuit. The first logic circuit also receives inputs from flip flops of state detecting circuits corresponding to other components. The first logic circuit is adapted to ensure that only flip flops corresponding to predetermined components will trigger the alarm gate if the outputs of the flip flops are indicating the third state of any one of the predetermined components.

The alarm gate is adapted to trigger an alarm or a shut-down of the hydraulic or other system.

The state detecting circuit of FIG. 3 includes a state detecting gate and second logic circuit. The state detecting gate is connected between the input and output respectively of the monostable circuit and is adapted to distinguish between a shut condition or an open or partially open condition of the component. The output of the state detecting gate is connected to a second logic circuit. The second logic circuit also receives inputs from state detecting gates of state detecting circuits corresponding to other components. The second logic circuit is adapted to generate one or more outputs indicative of one or more incompatible states of components. A fail-safe circuit is connected to the input as described above.

Referring to FIG. 4, a three state component (not shown) is operatively connectable to switching means comprising a two pole switch 40. The moving contact of the switch 40 is connected to a supply of steady state voltage +V. The fixed contacts or poles of switch 40 are connected to gating means comprising NOR gates 41 and 42. One pole is connected to one input of gate 41 and the other pole is connected to one input of gate 42. The other input of gate 41 is connected to the output of square wave generator 43, comprising a suitably configured I.C. timer circuit. The other input of gate 42 is connected to the output of gate 41. The output of gate 42 is connected to the output of the state signal generator via an inverter.

It will be seen that gate 41 will pass the square wave only when the switch 40 is in the open position (corresponding to the open position of the component being monitored). Similarly gate 42 will pass the square wave only when switch 40 is in the shut position, however because gate 41 will not pass the square wave when switch 40 is in the shut position and gate 42 can only receive square wave from gate 41, gate 42 cannot pass square wave unless switch 40 is in an intermediate position, ie. somewhere between the open and shut positions (corresponding to a partially open condition of the component being monitored).

The output of the state signal generator thus is square wave when switch 40 is in the intermediate position only. It may be seen that the output of the state signal generator is high when switch 40 is in the open poisition and is low when switch 40 is in the shut position. A pair of pull down resistors 45 and 46 are included in the circuit to ensure that the respective inputs to gates 41 and 42 do not float when the corresponding pole of switch 40 has no signal connected.

The state indicating means in FIG. 4 includes driver transistors 47–49 interconnected as shown. The base of transistor 49 is connected to "shut" pole of switch 40 via an inverter 50 to generate a "not shut" function. It will be ssen that LEDs 47*a*, 48*a* and 49*a* will illuminate when switch 40 is in the open, shut and not shut (or partially open) positions respectively.

Figure 5:
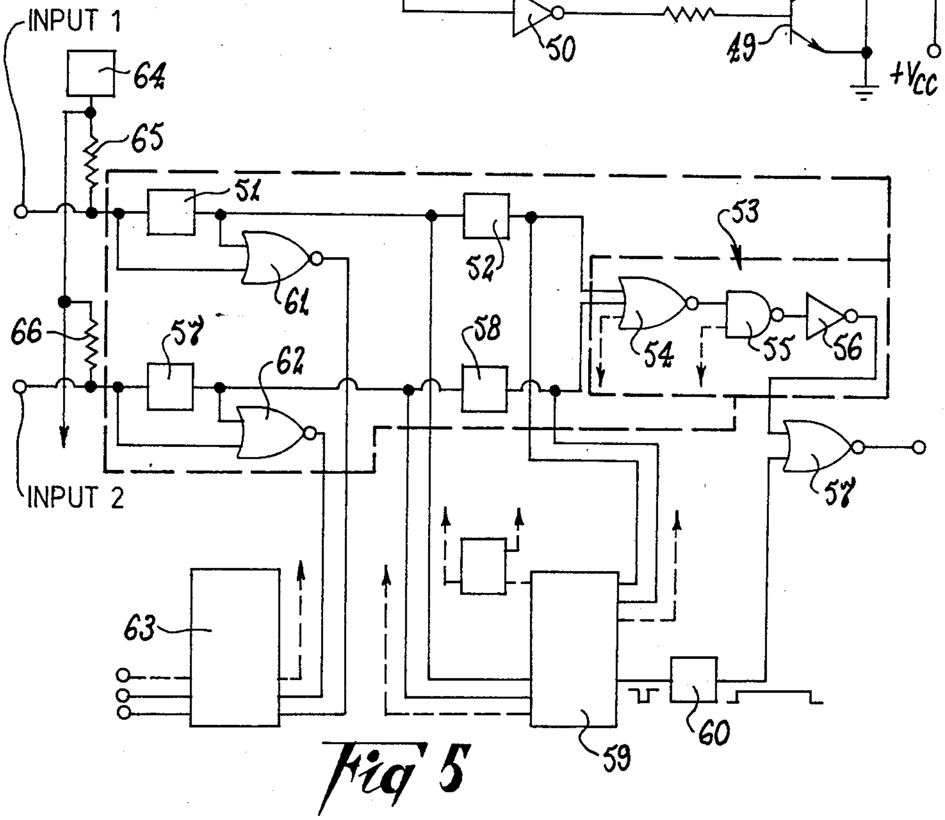
FIG. 5 shows in schematic form a preferred embodiment of a detecting means according to the present invention.

FIG. 5 shows two state detecting circuit having inputs 1 and 2 respectively adapted to receive signals from two separate state signal generators. State detecting circuit 1 includes monostable 51 and flip flop 52 interconnected as shown. The output of flip flop 52 is connected to a first logic circuit shown generally at 53. Logic circuit 53 includes NOR gate 54, NAND gate 55 and inverter 56 interconnected as shown.

State detecting circuit 2 comprises monostable 57 and flip flop 58 interconnected as shown. The output of flip flop 58 is also connected to logic circuit 53. The output of logic circuit 53 comprises the output of inverter 56 and is connected to alarm gate 57 comprising a NOR gate. The input and output respectively of flip flops 52 and 58 are connected to respective comparators shown generally at 59.

The comparators 59 are adapted to trigger timing signal generator 60 when one of the flip flops changes state. The comparators shown at 59 may be connected in cascade so that either flip flop 52 or 58 changing state will trigger timing signal generator 60. Timing signal generator 60 may comprise a monostable circuit adapted to generate a 30 second output pulse when triggered. The monostable may be provided in any suitable form.

The output of timing signal generator 60 is connected to one input of alarm gate 57. Generator 60 enables gate 57 when it reaches the end of its timing duration and providing that the output of logic circuit 53 still is logical low, corresponding to one of the flip flops 52 or 58 exhibiting a logical high output. A logical high at the output of flip flop 52 or 58 indicates that the corresponding component still is in its third or intermediate state.

State detecting circuit 1 includes state detecting gate 61 comprising a NOR gate having its inputs connected between the input and output respectively of monostable 51 as shown. State detecting circuit 2 also includes state detecting gate 62 connected between the input and output respectively of monostable 57.

It will be seen that the output of NOR gate 61 or 62 will be logical high when input 1 or 2 respectively is low (corresponding to a shut condition of the associated component). Similarly the output of NOR gate 61 or 62 will be logical low when input 1 or 2 respectively is high or is receiving a square wave (corresponding to an open or partially open condition of the associated component).

The outputs of NOR gates 61 and 62 are connected to a second logic circuit 63 shown generally at 63. Logic circuit 63 is adapted to generate one or more outputs indicative of incompatible states.

Incompatible states may be realised by means of NOR gates, NAND gates and inverters included in logic circuit 63.

One output of logic circuit 63 may be used to trigger an alarm or shut-down of the hydraulic or other system.

Fail-safe circuit 64 is connected to inputs 1 and 2 via resistors 65 and 66 respectively. Fail-safe circuit 64 comprises a 1 KHz square wave generator and is also used to supply clock pulses to flip flops 52 and 58. The impedance of resistors 65 and 66 is preferably one order of magnitude greater than the source impedance connected to inputs 1 or 2.

The broken arrows shown in FIG. 5 represent connections to corresponding parts of further state detecting circuits. As described above one state detecting circuit should be provided for each component being monitored.

It will be appreciated that various alterations, modifications and/or additions may be introduced into the constructions and arrangements of parts previously described without departing from the spirit or ambit of the invention.

I claim:

1. Apparatus suitable for use with an operative system for monitoring the operational state of at least one system component, said component having three states, said apparatus including a state signal generator for operative association with the component and responsive to the state of the component to generate and apply to a single output line a first steady DC signal for as long as said component is in a first state, a second steady DC signal for as long as said component is in a second state and an oscillating signal for as long as said component is in a third state, said first signal corresponding to a first digital signal, said second signal corresponding to a second digital signal and said oscillating signal comprising an alternating current signal.

2. Apparatus according to claim 1 wherein said first digital signal corresponds to a logical high level and said second digital signal corresponds to a logical low level, said alternating current signal comprising a square wave.

3. Apparatus according to claim 1 or 2 wherein said state signal generator includes switching means having three distinct switching states, and the switching means being in one of the three switching states when said component is in a respective one of the first, second and third states.

4. Apparatus according to claim 3 wherein said switching means includes a two pole switch, a first pole of said switch being connected to a steady DC source whenever said component is in said first state, the second pole of said switch being connected to said steady DC source whenever said component is in said second state, and neither pole being connected to said steady DC source whenever said component is in said third state.

5. Apparatus according to claim 3 wherein said state generator includes gating means coupled to said switching means so as to be responsive to the state thereof and an oscillating signal generator operatively connected to said gating means, said gating means being adapted to provide at its output one of said three signals corresponding to said state of said component, the output of said gating means comprising the output line of said state signal generator.

6. Apparatus according to claim 3 further including state indicating means at the location of the component being monitored.

7. Apparatus according to claim 6 wherein said indicating means includes a plurality of LED's and associated driver transistors connecable to said switching means.

8. Apparatus suitable for use with an operating system for monitoring the operational state of at least one system component, said component having three states, said apparatus including: a state signal generator for operative association with the component and responsive to the state of the component to generate and apply to a single output line a first steady DC signal for as long as said component is in a first state, a second steady DC signal for as said component is in a second state and an oscillating signal for as long as said component is in a third state, said apparatus further including a state detecting means for receiving the signals on said output line and for detecting the state of said at least one component and for providing an alarm whenever a predetermined condition of said operative system is detected, said predetermined condition comprising one said component remaining in its third state for a predetermined period of time, said state detecting means including a detecting circuit for each said component being monitored, said detecting circuit being operative to distinguish between said first steady DC signal, said second steady DC signal, and said oscillating signal which respectively correspond to said three operational states of each said component.

9. Apparatus according to claim 8 including a fail safe circuit connectable to an input of said state detecting means.

10. Apparatus according to claim 8 wherein each said detecting circuit includes means for detecting a change from the first or the second state of a corresponding component to the third state thereof, each said detecting circuit further including a timing signal generator operative to produce a timing signal having a predetermined duration in response to detection of a transition of said component to its third state.

11. Apparatus according to claim, 10 wherein said means for detecting a change includes a retriggerable monostable circuit connectable to the output of a respective state signal generator and adapted to provide an output signal which is maintained as long as said third state signal is being received by said respective detecting circuit.

12. Apparatus according to claim 11 wherein the output of said monostable circuit and the output of said timing signal generator are applied to an alarm gate operative to generate an alarm signal if the output of said monostable circuit is still indicating said third state of said component at the end of said predetermined duration.

13. Apparatus according to claim 11 wherein each said detecting circuit includes a flip flop and a comparator, said flip flop being connected to the output of a corresponding said monostable circuit, one input of the comparator also being connected to the output of a corresponding said monostable circuit, the other input of the comparator being connected to the output of said flip flop, the output of said comparator being adapted to trigger said timing signal generator.

14. Apparatus according to claim 13 wherein the output of each said flip flop and the output of said timing signal generator are applied to an alarm gate operative to generate an alarm signal if the output of a preselected number of flip flops is still indicating said third state of said component at the end of said predetermined duration.

15. Apparatus according to claim 14 wherein the output of each said flip flop is connected to said alarm gate via a first combinational logic circuit, said first logic circuit being adapted to determine said preselected flip flops.

16. Apparatus according to claim 11 wherein each said state detecting circuit includes a state detecting gate, one of the inputs of each detecting gate being connectable to the output of the respective state signal generator, the other input thereof being connected to the output of a corresponding monostable circuit.

17. Apparatus according to claim 16 including a second combinational logic circuit for receiving an input from each state detecting gate and adapted to generate one or more outputs indicative of one or more incompatible states.

18. Apparatus according to claim 17 wherein said second logic is adapted to determine said incompatible states.

* * * * *